United States Patent
Brown et al.

(10) Patent No.: US 10,822,010 B1
(45) Date of Patent: Nov. 3, 2020

(54) VEHICLE HARD TOP ASSISTANCE APPARATUS AND METHOD OF USE

(71) Applicants: Hugh Brown, Oxford, MS (US);
Tatum Brown, Oxford, MS (US)

(72) Inventors: Hugh Brown, Oxford, MS (US);
Tatum Brown, Oxford, MS (US)

( * ) Notice: Subject to any disclaimer, the term of this patent is extended or adjusted under 35 U.S.C. 154(b) by 268 days.

(21) Appl. No.: 15/962,493

(22) Filed: Apr. 25, 2018

Related U.S. Application Data

(60) Provisional application No. 62/490,302, filed on Apr. 26, 2017.

(51) Int. Cl.
*B62B 3/04* (2006.01)
*B65D 19/08* (2006.01)
*B65D 61/02* (2006.01)
*B60J 7/10* (2006.01)

(52) U.S. Cl.
CPC .......... *B62B 3/04* (2013.01); *B65D 19/08* (2013.01); *B65D 61/02* (2013.01); *B60J 7/106* (2013.01); *B65D 2519/00293* (2013.01); *B65D 2519/00805* (2013.01)

(58) Field of Classification Search
CPC .... B60P 1/02; B60P 1/022; B60P 1/36; B60P 1/365; B60P 1/38; B60P 1/44; B60P 1/52; B60P 3/06–07; B62D 65/06; B62B 1/00; B62B 1/04; B62B 1/06; B62B 1/08; B62B 1/14; B62B 1/142; B62B 1/145; B62B 1/22; B62B 1/268; B60J 7/106
See application file for complete search history.

(56) References Cited

U.S. PATENT DOCUMENTS

| | | | | | |
|---|---|---|---|---|---|
| 1,349,450 | A | * | 8/1920 | French | B62B 1/00 414/659 |
| 2,305,762 | A | * | 12/1942 | Ugo | B60P 1/52 414/538 |
| 2,432,182 | A | * | 12/1947 | Turner | B60P 1/52 414/437 |

(Continued)

FOREIGN PATENT DOCUMENTS

| | | | | |
|---|---|---|---|---|
| DE | 1755118 A1 | * | 12/1971 | B60P 1/52 |
| GB | 1088269 A | * | 10/1967 | B60P 1/52 |

*Primary Examiner* — Tyrone V Hall, Jr.
(74) *Attorney, Agent, or Firm* — Veritay Group IP; Susan B. Fentress

(57) ABSTRACT

The inventive subject matter is a bi-directional adjustable roller lift apparatus and a method of use of the apparatus. The bi-directional adjustable roller lift apparatus is made of: a top surface having two sections: a left top surface section and a right-top surface section where the distance between the left-top surface section and a right-top surface section corresponds to the width of a vehicle tire; each of the two sections having a roller assembly disposed on a front-end portion; a supporting frame made of a plurality of vertical elements and a plurality of horizontal elements, wherein a portion of the top surface with the roller assembly projects past the supporting frame; wherein each of the of plurality vertical elements and each of the plurality of horizontal elements are made of a larger channel and a smaller channel, the smaller channel sized to fit within the larger channel, each of the larger channel and a smaller channel having a plurality of corresponding openings sized to accommodate a fastener.

2 Claims, 8 Drawing Sheets

(56) References Cited

U.S. PATENT DOCUMENTS

| | | | |
|---|---|---|---|
| 3,455,474 A * | 7/1969 | Truncali | B60P 1/52 |
| | | | 414/485 |
| 3,946,876 A | 3/1976 | Jay | |
| 4,247,009 A | 1/1981 | Vaurigaud | |
| 4,295,431 A | 10/1981 | Stavlo | |
| 4,302,023 A * | 11/1981 | Kiesz | B62B 3/02 |
| | | | 108/106 |
| D296,279 S | 6/1988 | Baldree et al. | |
| 5,016,893 A * | 5/1991 | Hart, Jr. | B62B 3/10 |
| | | | 211/195 |
| 5,078,415 A | 1/1992 | Goral | |
| 5,277,439 A * | 1/1994 | Pipes | B62B 1/20 |
| | | | 280/47.2 |
| 5,468,010 A * | 11/1995 | Johnson | B62B 1/12 |
| | | | 280/47.27 |
| 6,171,048 B1 * | 1/2001 | Grimes | B62B 3/02 |
| | | | 414/427 |
| 8,641,355 B2 * | 2/2014 | Pawlak | B60P 1/548 |
| | | | 212/180 |
| D754,992 S | 5/2016 | Brown et al. | |
| 2009/0174205 A1 | 7/2009 | Kim | |
| 2009/0309079 A1 * | 12/2009 | Lacina | B60J 7/106 |
| | | | 254/47 |
| 2015/0368052 A1 | 12/2015 | Sheesley | |
| 2016/0025461 A1 | 1/2016 | Roberts et al. | |
| 2018/0147970 A1 * | 5/2018 | Lasley | B63C 13/00 |

* cited by examiner

VEHICLE HARD TOP ASSISTANCE APPARATUS AND METHOD OF USE

CROSS-REFERENCE TO RELATED APPLICATIONS

This application claims the benefit of U.S. Application Ser. No. 62/490,302 filed Apr. 26, 2017, under 35 U.S.C. 119(e), hereby specifically incorporated by reference in its entirety.

STATEMENT REGARDING FEDERALLY SPONSORED RESEARCH OR DEVELOPMENT

None.

THE NAMES OF THE PARTIES TO A JOINT RESEARCH AGREEMENT

None

REFERENCE TO A "SEQUENCE LISTING", A APPARATUS, OR A COMPUTER PROGRAM LISTING APPENDIX SUBMITTED ON A COMPACT DISC AND AN INCORPORATION-BY-REFERENCE OF THE MATERIAL ON THE COMPACT DISC

None.

BACKGROUND OF THE INVENTION

Field of the Invention

This disclosure relates to a bi-directional adjustable roller lift apparatus for use with a vehicle including a body and a removable hard-top.

Description of Related Art Including Information Disclosed Under 37 CFR 1.97 and 1.98

Various apparatuses are known to assist in the removal or replacement of a hard-top on a vehicle, such as a jeep. These apparatuses include a means to hoist the hard-top above the vehicle. These apparatuses include an attachment connected to the ceiling, such as a sling. Some are manual, and others are electrically powered. For example, U.S. Pat. No. 6,959,918 issued to Samuels discloses a truck cap lifting and storage assembly made of: a first elongated member and a second elongated member each having a first end, a second end, a top side, a bottom side, and a pair of lateral side edges; a plurality of support panels each having an upper surface and a lower surface; a plurality of securing members, each of the securing members securing each of the lower surfaces to one of the top sides such that each of the elongated members has two panels attached thereto, each of the panels having a width greater than a width of the elongated members, such that each of the panels extends beyond each of the lateral sides; a lifting assembly being attached to each of the first and second elongated members, such that the first and second elongated members are selectively lifted or lowered, the lifting assembly supporting the first and second elongated members, such that the elongated members are spaced from each other and are parallel to each other; and wherein the truck cap is positioned on the elongated members and selectively raised or lowered by the lifting assembly. Similarly, U.S. Pat. No. 5,897,104 discloses a hard-top storage apparatus for storing a removable vehicle hard-top and has an overhead hoist including a depending lifting member attached to a sling including sling members which extend around and under opposite extremities of the hard-top and across the underside of the hard-top and are releasably joined at the underside of the hard-top in such a way that the sling members support the hard-top with a cradling action and without any direct attachment of the sling members to the hard-top when the hoist is operated to lift the sling and hard-top to an elevated storage position. Certain of the sling members are spaced by a stabilizing member to maintain the cradled hard-top in a balanced position. However, a vehicle hard-top is expensive and heavy. Damage can occur to the vehicle, the structure, the hard-top or the user if during the lift a mechanical failure occurs. Therefore, a need exists in the industry for an apparatus that can be adapted to a wide-range of vehicles but does not present the risk associated with a heavy part suspended in the air.

BRIEF SUMMARY OF THE INVENTION

The inventive subject matter is a bi-directional adjustable roller lift apparatus made of: a top surface having two sections: a left top surface section and a right-top surface section where the distance between the left-top surface section and a right-top surface section corresponds to the width of a vehicle tire; each of the two sections having a roller assembly disposed on a front-end portion; a supporting frame made of a plurality of vertical elements and a plurality of horizontal elements, wherein a portion of the top surface with the roller assembly projects past the supporting frame; wherein each of the plurality of vertical elements and each of the plurality of horizontal elements are made of a larger channel and a smaller channel, the smaller channel sized to fit within the larger channel, each of the larger channel and a smaller channel having a plurality of corresponding openings sized to accommodate a fastener.

The inventive subject matter also includes a method to remove or replace a vehicle hard-top. The inventive steps including: disconnecting the vehicle hard-top from a vehicle; contacting the vehicle with a bi-directional adjustable roller lift apparatus; adjusting the plurality of vertical elements of the bi-directional adjustable roller lift apparatus so that the height of the bi-directional adjustable roller lift approximated the height of the bottom of the edge of the hard-top; lifting the hard-top to contact the roller assembly; and rolling the hard-top across the roller assembly until the hard-top is positioned on the top surface of the bi-directional adjustable roller lift apparatus.

BRIEF DESCRIPTION OF SEVERAL VIEWS OF THE DRAWING(S)

The invention can be best understood by those having ordinary skill in the art by reference to the following detailed description when considered in conjunction with the accompanying drawings in which.

DETAILED DESCRIPTION OF THE INVENTION

Figure 1:
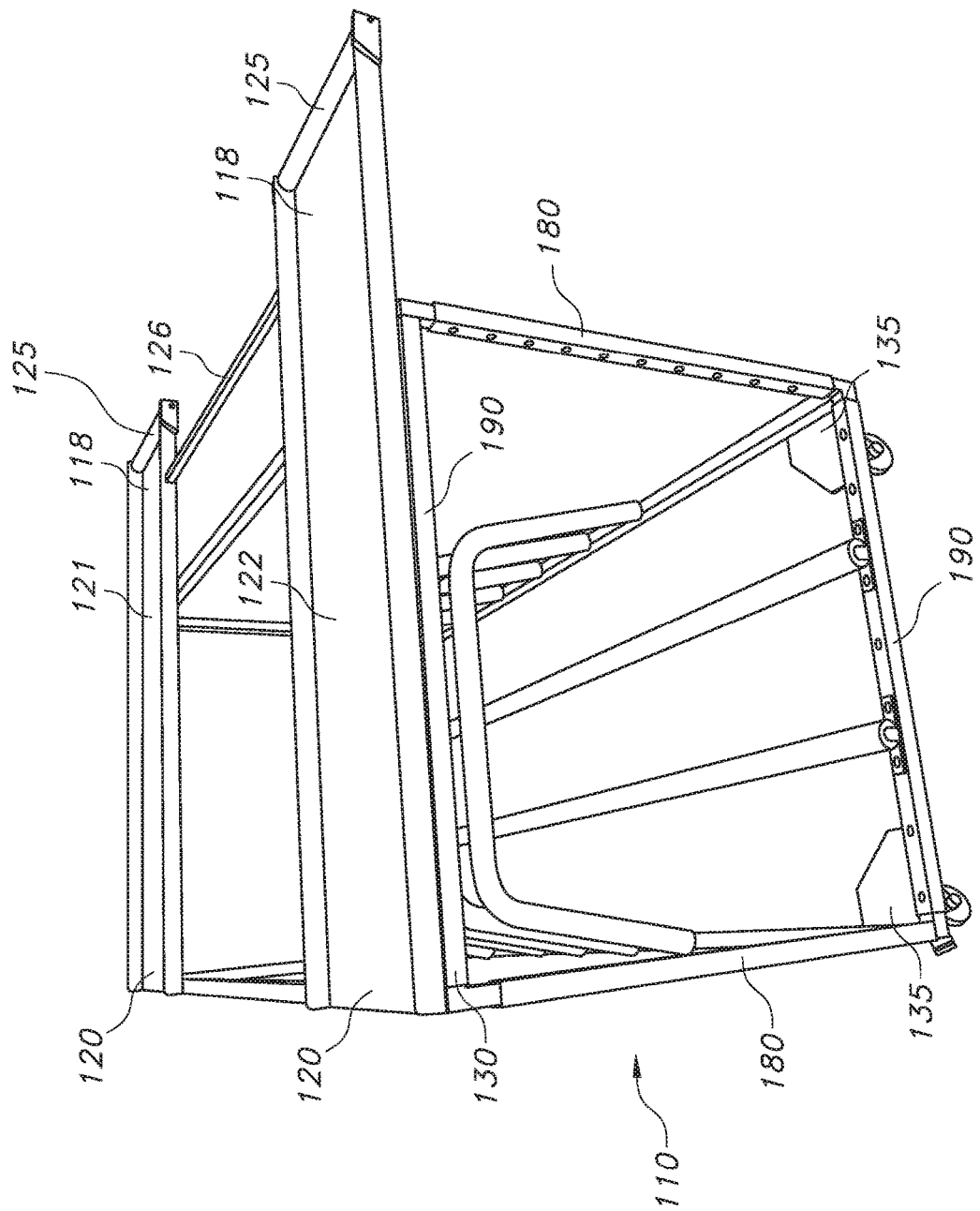
FIG. 1 is an isometric view of the adjustable apparatus of the present invention.
Figure 2:
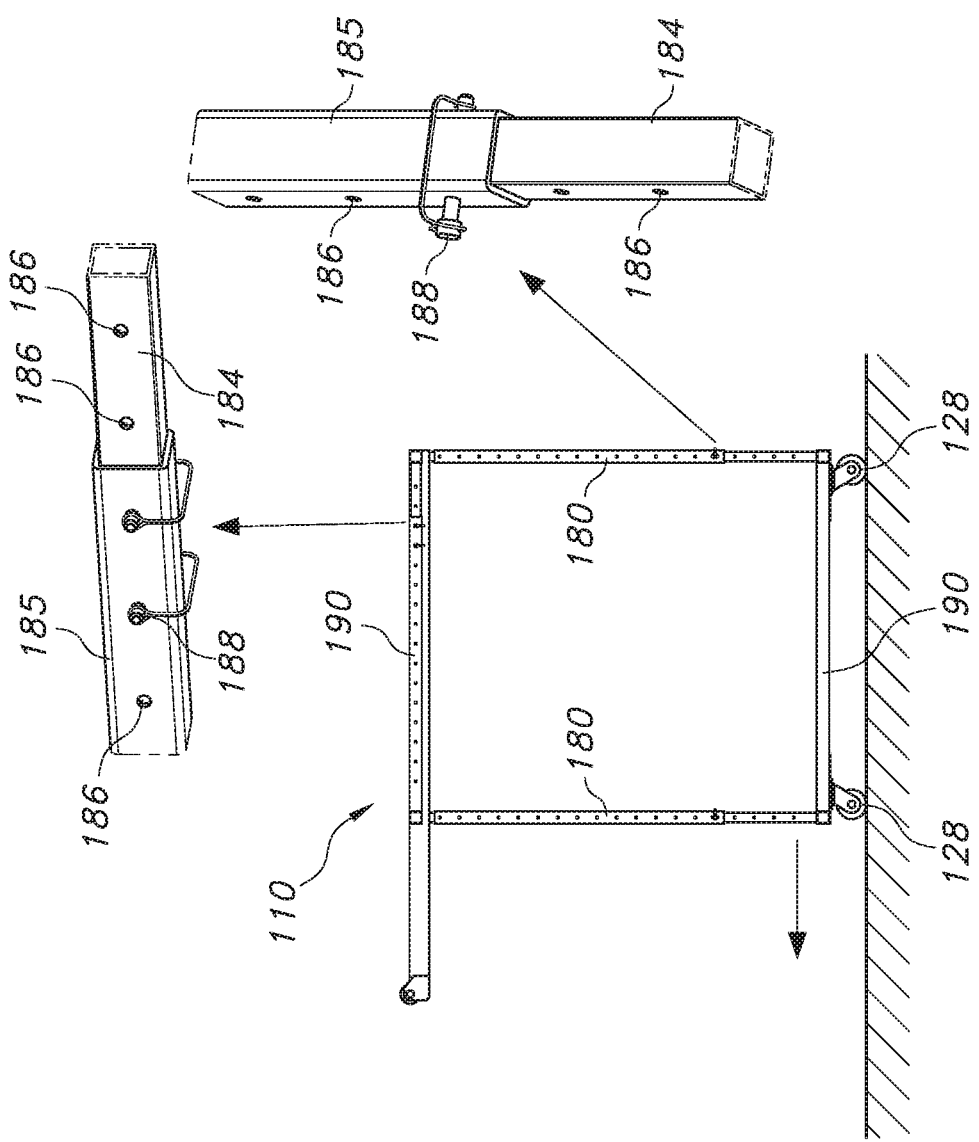
FIG. 2 illustrates a side view of apparatus with an exploded view of the vertical and horizontal of the present invention.

The present invention may be understood more readily by reference to the following detailed description of the invention. It is to be understood that this invention is not limited to the specific apparatus, methods, conditions or parameters described herein, and that the terminology used herein is for describing embodiments by way of example only and is not intended to be limiting of the claimed invention. Also, as used in the specification including the appended claims, the singular forms "a," "an," and "the" include the plural, and reference to a numerical value includes at least that value, unless the context clearly dictates otherwise. Similarly, when values are expressed as approximations, by use of the antecedent "about," it will be understood that the value forms another embodiment.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the inventions and are not restrictive of the invention as claimed. Unless defined otherwise, all technical and scientific terms used herein have the same meaning as commonly understood by one of ordinary skill in the art to which this invention belongs. Reference will now be made in detail to the presently preferred embodiments of the invention, examples of which are illustrated in the accompanying drawings. Throughout the following detailed description, the same reference numerals refer to the same elements in all figures.

Referring to FIGS. 1-5, an illustrative embodiment is provided showing a bi-directional adjustable roller lift apparatus 110 for use to support a removable hard-top while removing or replacing the hard top from a vehicle. The bi-directional adjustable roller lift apparatus 110 has a top surface 120 that is configured to support the frame of the detached hardtop of a jeep. The top surface 120 has a front 118 end. The top surface 120 of the bi-directional adjustable roller lift apparatus 110 is formed of two sections: the left top surface section 121 and the right top surface section 122. The left top surface section 121 and the right top surface section 122 correspond to the frame of the removable hard-top of a jeep. The distance between the left top surface section 121 and the right top surface section 122 corresponds to the width of the tire typically affixed to the rear of a jeep. The top surface 120 can be a flat panel or form a channel and it can be made of a rigid material such as stainless steel or plastic. A stiffening bar 126 can be affixed between the left top surface section 121 and the right top surface section 122 of the top surface 120.

A top-view of the roller assembly of the adjustable apparatus of the present invention is shown. Each of the left-top surface section 121 and the right-top surface section 122 has a roller assembly 125 positioned near or on the front-end portion 118. The roller assembly 125 in this exemplary embodiment is bisected by spool 127 and spool 127 is connect to a side frame 129 of the lift apparatus top 120. One exemplary example, of the at least one roller assembly 125, is a IRONTON roller (Northern Tool & Equipment Company, Inc) attached to the apparatus top 120 with a bracket set having 2 and ⅜ inches in diameter and 15¾ inches roller length. In another exemplary embodiment, the at least one roller assembly 125 can be made integral with the adjustable roller lift apparatus top surface 120.

The adjustable roller lift apparatus top surface 120 (left-top surface section 121 and the right-top surface section 122) is connected to a rectangular supporting frame 130. A portion of the top surface 120 (the first channel 121 and the second channel 122) projects away from the supporting frame 130. The length of the portion of the top surface 120 that projects away from the supporting frame 130 corresponds with the area of the vehicle having a tire and a bumper. A stiffening panel 135 can be connected to the frame 130.

The supporting frame 130 of the bi-directional adjustable roller lift apparatus 110 provides adjustable horizontal and vertical members of the supporting frame 130. The supporting frame 130 is made of a plurality of vertical elements 180 referred to as "legs." In the preferred embodiment there are four legs 180. The supporting frame 130 is made of a plurality of horizontal elements 190 referred to as "arms." In the preferred embodiment there are four arms 190 forming a rectangular shape. The supporting frame 130 is made of a material, such as stainless steel, that can maintain the top surface 120 in an apparatus horizontal position as the weight of the removable hard-top 100 contacts the top surface 120. At least a portion of the horizontal and vertical members of the supporting frame 130 are adjustable. Each of the vertical elements 180 and horizontal elements 190 are made of a larger channel 185 and a smaller channel 184. The smaller channel 184 is sized to fit within the larger channel 185. Each of the larger channel 185 and a smaller channel 184 has a series of corresponding openings 186. When the length of the vertical elements 180 and horizontal elements 190 are each at the desired length for operation or storage, the openings 186 are aligned and at least one set of openings (as the larger channel 185 overlaps smaller channel 184) is secured by means of passing a fastener 188 such as a pin through the opening 186 in both the overlapping larger channel 185 and smaller channel 184.

Figure 3:
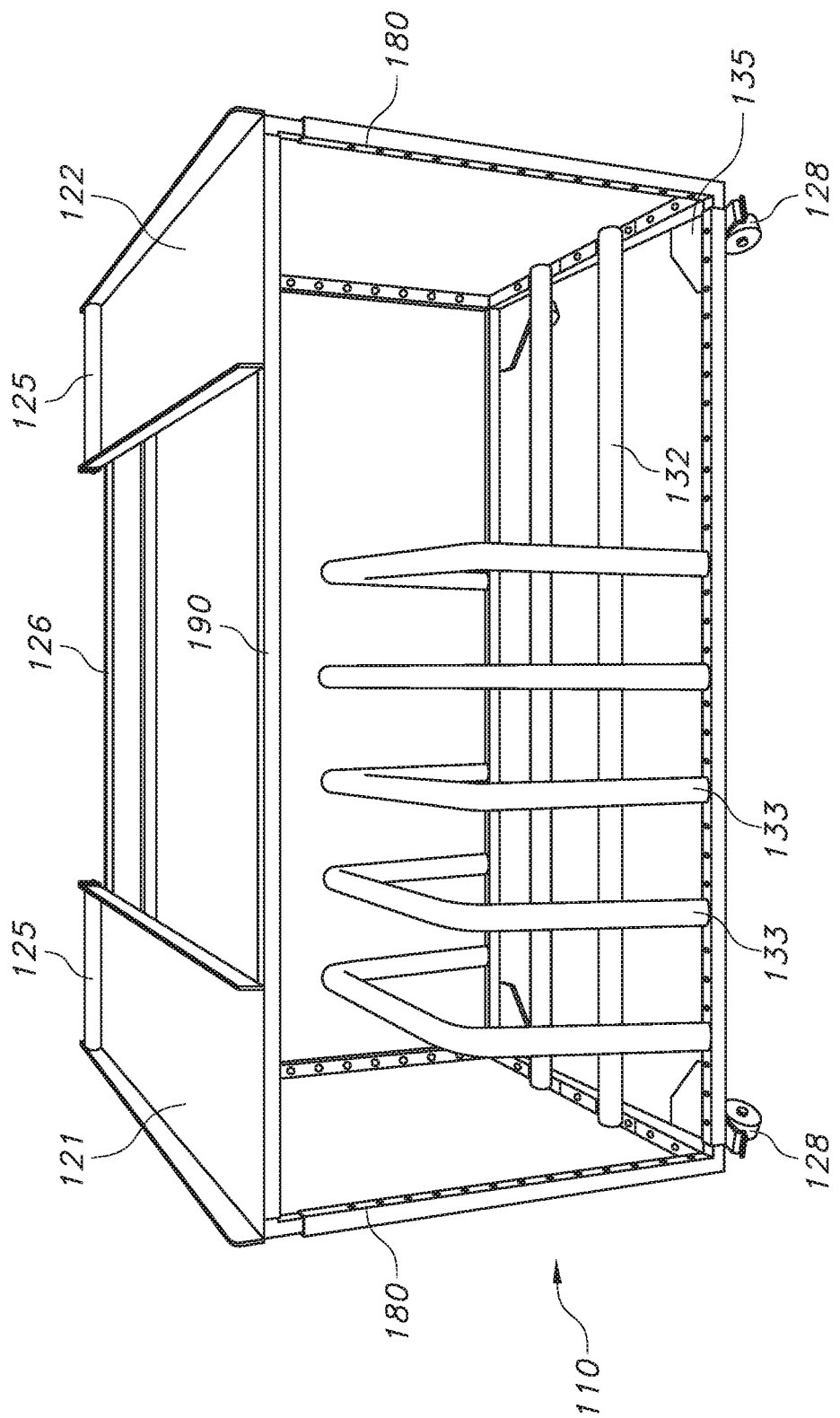
FIG. 3 is a side-view of the adjustable horizontal and vertical members of the supporting frame.
Figure 4:
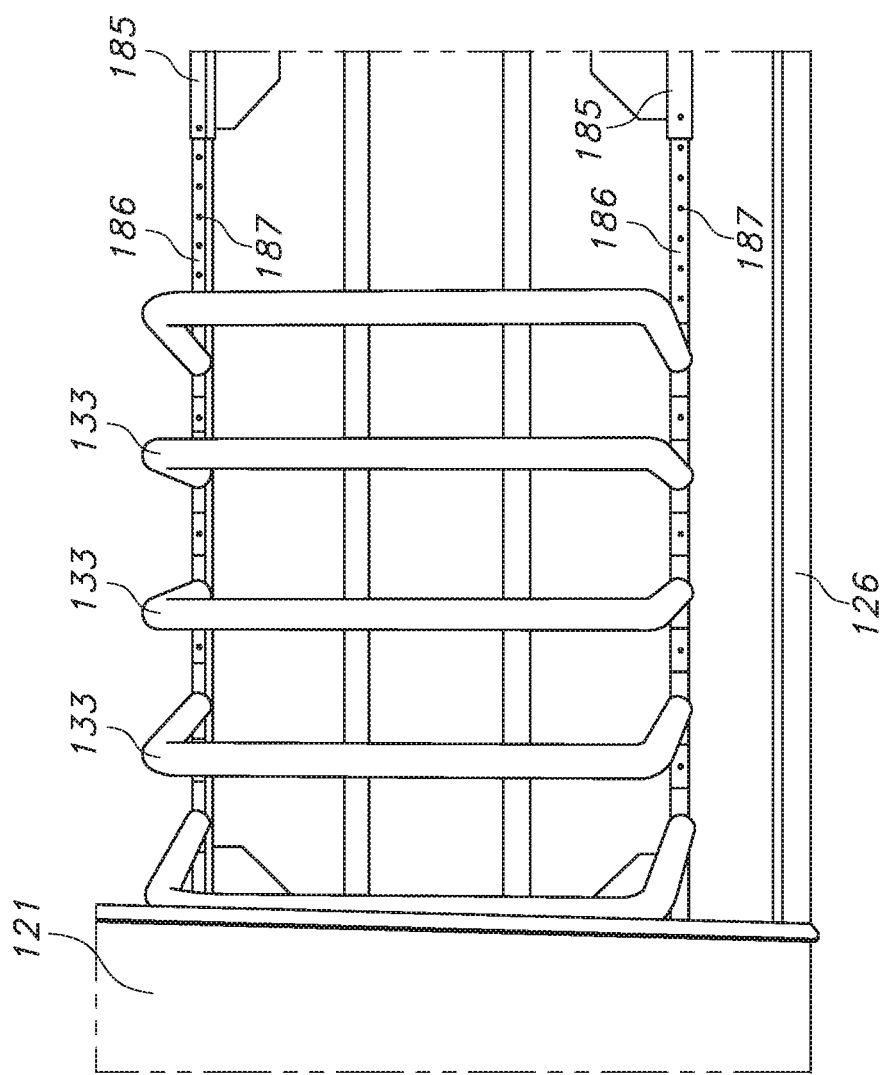
FIG. 4 is a top-view of the adjustable apparatus of the present invention.
Figure 5:
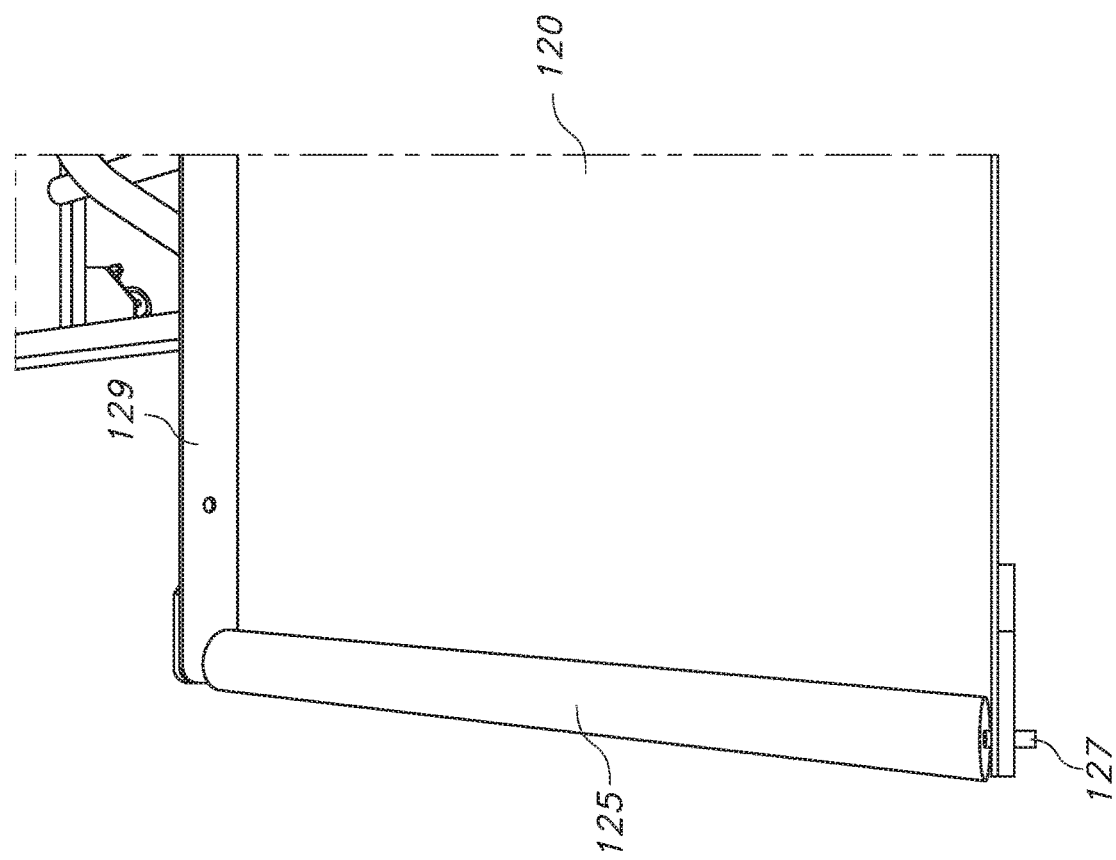
FIG. 5 is a top-view of the roller assembly of the adjustable apparatus of the present invention.

Now referring to FIG. 3, in one illustrative embodiment, the supporting frame 130 can include various attachments, a plurality of first flexile attachments 132 span between two of the horizontal elements 190. In another exemplary embodiment, a plurality of second attachments 133 span between two of the vertical elements 180. These second attachments 133 can be used for additional storage.

Figure 6:
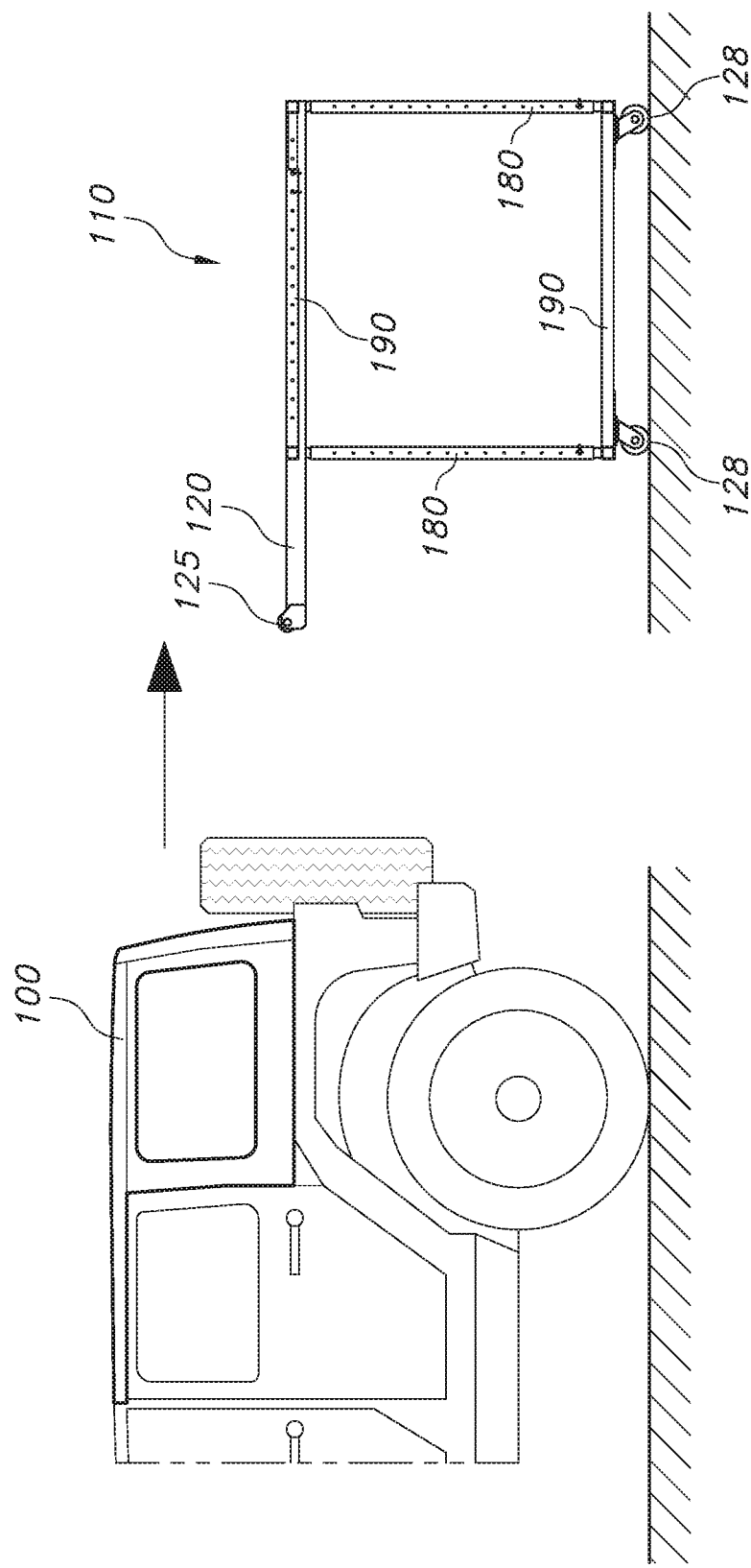
FIG. 6 illustrates a side view of apparatus with a detached hard-top portion of a vehicle.
Figure 7:
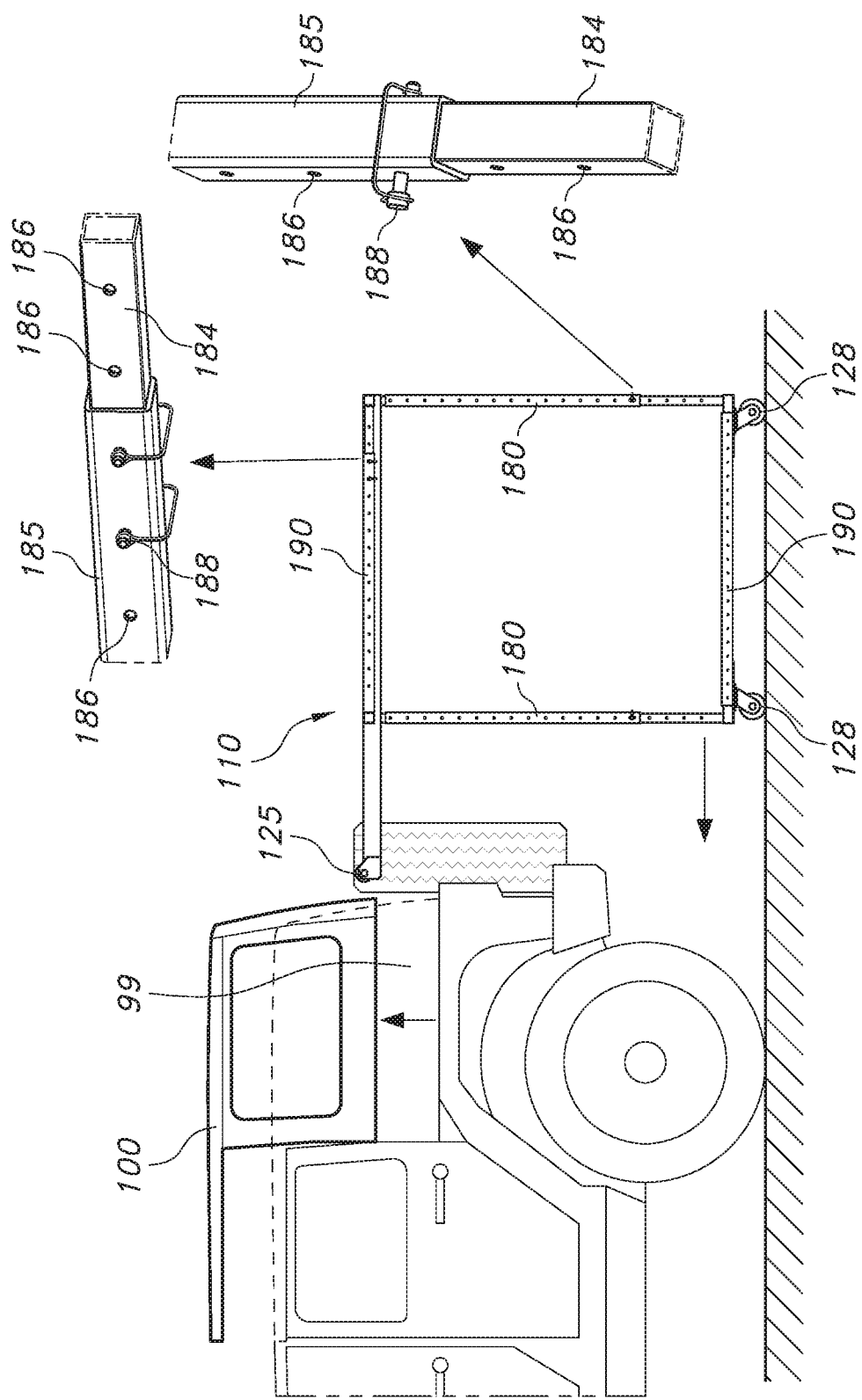
FIG. 7 illustrates a side view of apparatus with a detached hard-top portion of a vehicle.
Figure 8:
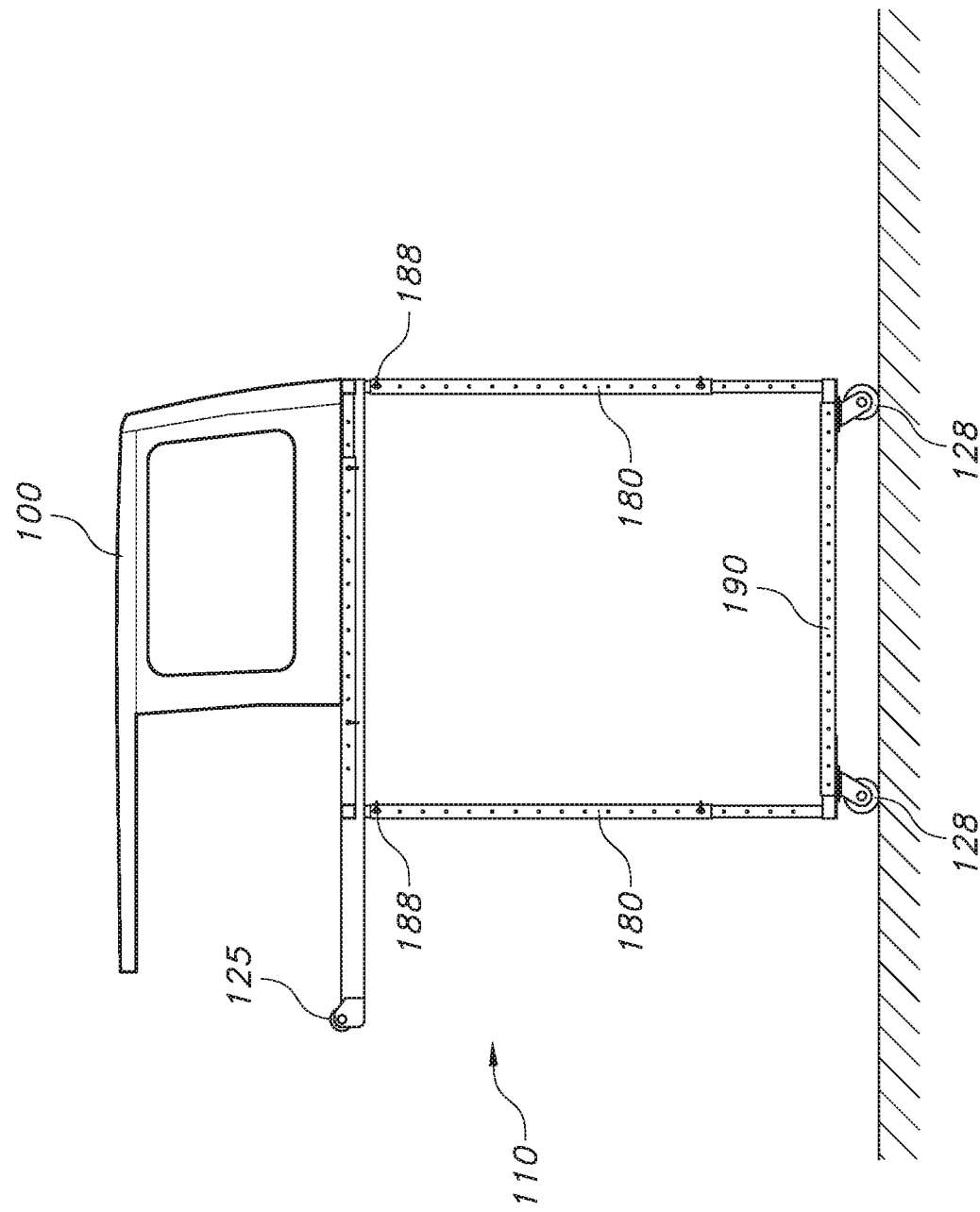
FIG. 8 illustrates a side view of apparatus with a detached hard-top portion of a vehicle.

Now referring to FIGS. 6-8 the steps to remove a hard-top 100 from a vehicle involves the steps of: removing all of the screws that connect the hard-top 100 to the vehicle 99. Once all screws are removed and electrical cables are unplugged, the bi-directional adjustable roller lift apparatus 110 is moved to the back of the vehicle 99. The bi-directional adjustable roller lift apparatus 110 is centered and against the tire or tires 98 of the vehicle 99. The height of the bi-directional adjustable roller lift apparatus 110 is adjusted to position the at least one roller assembly 125 about 1 to 2 inches behind and about 1 to 2 inches higher than the bottom of the edge of the hard-top 100. The bi-directional adjustable roller lift apparatus 110 is moved in the horizontal direction by wheels 128 affixed to the frame 130. Once the bi-directional adjustable roller lift apparatus 110 is in position, the bi-directional adjustable roller lift apparatus 110 is locked in place.

The user enters the vehicle 99 and manually lifts the hard-top 100 on to the roller assembly 125 from the center of the hard-top 100. It should be noted that being centered under the hard-top 100 makes it easier for a user to lift and allows the hard-top 100 to evenly roll onto the roller assembly 125 of each of the left-top surface section 121 and the right-top surface section 122. If the process involves attaching a hard-top 100 back on to the vehicle, the steps are reversed. The bi-directional adjustable roller lift apparatus 110 permits the removal or installation of a heavy hard-top 100 on to a vehicle by a single user with minimal effort.

Equivalent elements can be substituted for the ones set forth above such that they perform in substantially the same manner in substantially the same way for achieving substantially the same result. It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages, the form herein before described being merely exemplary and explanatory embodiment thereof. It is the intention of the following claims to encompass and include such changes.

The invention claimed is:

1. A method to remove or replace a vehicle hard-top of a jeep by a single user comprising the steps of:
   providing a bi-directional adjustable roller lift apparatus comprised of:
   a top surface comprised of two sections: a left top surface section and a right-top surface section where the distance between the left-top surface section and a right-top surface section corresponds to the width of a vehicle tire; each of the two sections having a roller assembly disposed on a front-end portion said left top surface section and the right-top surface section each forming a channel;
   a supporting frame comprised of a plurality of vertical elements and a plurality of horizontal elements, wherein a portion of the top surface with the roller assembly projects past the supporting frame; wherein each of the plurality of vertical elements and each of the plurality of horizontal elements are comprised of a larger channel and a smaller channel, said smaller channel sized to fit within the larger channel, each of the larger channel and a smaller channel having a plurality of corresponding openings sized to accommodate a fastener and wheels affixed to the supporting frame;
   wheeling the bi-directional adjustable roller lift apparatus to contact the back vehicle tire, wherein a horizontal element of the supporting frame contacts the back vehicle tire and wherein the bi-directional adjustable roller lift apparatus projects the left-top surface section and the right-top surface section away from the supporting frame corresponding to the length of the area for the back tire and bumper;
   adjusting the plurality of vertical elements of the bi-directional adjustable roller lift apparatus to the height of the bottom of the edge of the hard-top;
   disconnecting the vehicle hard-top from the vehicle;
   manually lifting the hard-top to contact the roller assembly of the two sections of the top surface, wherein at the time of contact the roller assembly is projecting away from the supporting frame corresponding to the length of the area for the back tire and bumper;
   rolling the hard-top across the roller assembly of the two sections of the top surface; and
   supporting a detached hard-top of the jeep in a channel on the top surface of the bi-directional adjustable roller lift apparatus.

2. The method of claim 1 further comprising the steps of:
   positioning the hard-top on the top surface of the bi-directional adjustable roller lift apparatus;
   rolling the hard-top across the roller assembly;
   lifting the hard-top to contact the vehicle;
   positioning the hard-top on the vehicle;
   and connecting the vehicle hard-top to the vehicle.

* * * * *